United States Patent [19]
Garnweidner

[11] Patent Number: 6,019,273
[45] Date of Patent: Feb. 1, 2000

[54] PROCESS FOR MANUFACTURING THE FRAME OF A BACK REST OF A VEHICLE

[75] Inventor: Peter Garnweidner, Lamprechtshausen, Austria

[73] Assignee: Euromotive Ges.m.b.H., Ranshofen, Austria

[21] Appl. No.: 08/817,922

[22] PCT Filed: Sep. 6, 1996

[86] PCT No.: PCT/EP96/03925

§ 371 Date: Aug. 4, 1997

§ 102(e) Date: Aug. 4, 1997

[87] PCT Pub. No.: WO97/09196

PCT Pub. Date: Mar. 13, 1997

[30] Foreign Application Priority Data

Sep. 8, 1995 [AT] Austria ..................................... 1492/95

[51] Int. Cl.[7] ....................................................... B60N 2/44
[52] U.S. Cl. .................... 228/144; 297/452.18; 297/391; 297/410
[58] Field of Search ........................ 228/144; 297/452.18, 297/452.2, 391, 410, 452.8

[56] References Cited

U.S. PATENT DOCUMENTS

| | | |
|---|---|---|
| 1,684,062 | 9/1928 | Leach et al. . |
| 2,720,914 | 10/1955 | Doty et al. ............................... 155/195 |
| 5,412,860 | 5/1995 | Miyauchi et al. ...................... 29/527.1 |
| 5,499,863 | 3/1996 | Nakane et al. ........................ 297/452.2 |
| 5,769,499 | 6/1998 | Dudash et al. ...................... 297/452.18 |

*Primary Examiner*—Patrick Ryan
*Assistant Examiner*—M. Alexandra Elve
*Attorney, Agent, or Firm*—Sixbey, Friedman, Leedom & Ferguson; David S. Safran

[57] ABSTRACT

The invention relates to a process for producing the frame of the backrest of a motor vehicle seat from an originally straight metallic profile part which preferably has an I-shaped cross sectional area and which is bent into a U shape. In the middle part only one opening is formed in web (1), then it is closed again by the pressure of two compression jaws which move chords (2) towards one another in this middle part. In doing so opposite edge areas of the opening form joint (4). The adjacent planar areas of the web are joined to one another preferably by welding at this joint.

6 Claims, 6 Drawing Sheets

PROCESS FOR MANUFACTURING THE FRAME OF A BACK REST OF A VEHICLE

BACKGROUND OF THE INVENTION

1. Technical Field

The invention relates to a process for producing the frame of the backrest of a motor vehicle seat.

2. Description of Related Art

Backrest frames of motor vehicle seats normally consist of metal and have the shape of an inverted U. The legs of the U are furthermore called the longitudinal bar, the base piece the transverse bar.

The backrest frame is the most strongly loaded in frontal collisions (from back or from front) of the motor vehicle when the individual occupying the seat is accelerated with the torso and head against the backrest and headrest. In this process, the longitudinal bar is flexurally loaded around an axis which lies horizontally and transversely to the direction of travel. The transverse bar is flexurally loaded around an axis which forms the intersection line between the backrest frame and a vertical frame parallel to the direction of travel. The transverse bar is torsionally loaded at the location of the headrest attachment.

The greatest bending moment occurs on the ends of the longitudinal bar on the seat surface side. With increasing distance from these ends the bending stress becomes less in the longitudinal bars.

For the purposes of lightweight construction, the metal part which forms the backrest frame at all locations should have a cross-sectional area which is matched as accurately as possible to the maximum load to be withstood. Backrest frames which are made from a round pipe or extruded section which have a constant cross sectional area over their length are therefore disadvantageous, since the minimum cross-sectional area caused by the locations of greatest possible stress is also maintained at those locations at which major stress need never be expected.

The disadvantage of the constant profile cross section is bypassed in frames which are produced as castings or from folded and bent sheet metal. However these frames cause high tool costs and a larger number of expensive production steps and quality assurance measures. Castings moreover have lower ductility, i.e. they break at low deformation.

SUMMARY OF THE INVENTION

The object of the invention is to make available a backrest frame with a cross-sectional area which is matched to the maximum stress to be expected at the respective locations, and which is comprised of a metallic alloy which can be better formed than cast alloys and which can be produced with fewer processing steps as compared to a sheet metal structure.

To achieve this object, as the base piece a straight metallic, rolled or extruded profile part with an I-shaped cross-sectional area which is constant over the profile length is used, with a length which corresponds to the stretched length of the backrest frame. In the longitudinal middle part of the profile part, material is removed from its web, for example, by punching in the direction perpendicular to the web so that an opening is formed with a greatest dimension which is at least parallel to the profile direction. This opening is closed again in another step by pressing on the two profile chords by means of a pressing device in the longitudinal area in which the opening was formed parallel to the plane of the web and perpendicularly to the profile direction so that the two chords move toward one another, and thus, the web of the profile becomes narrower until the two edges of the opening which lie opposite one another in the web plane perpendicular to the profile direction abut. Then these abutting edges are joined to one another by welding. Finally, the profile part is bent into a U-shape around axes which lie at least roughly perpendicularly to the profile direction and parallel to the surface formed by the web.

DETAILED DESCRIPTION OF THE INVENTION

Figure 1:
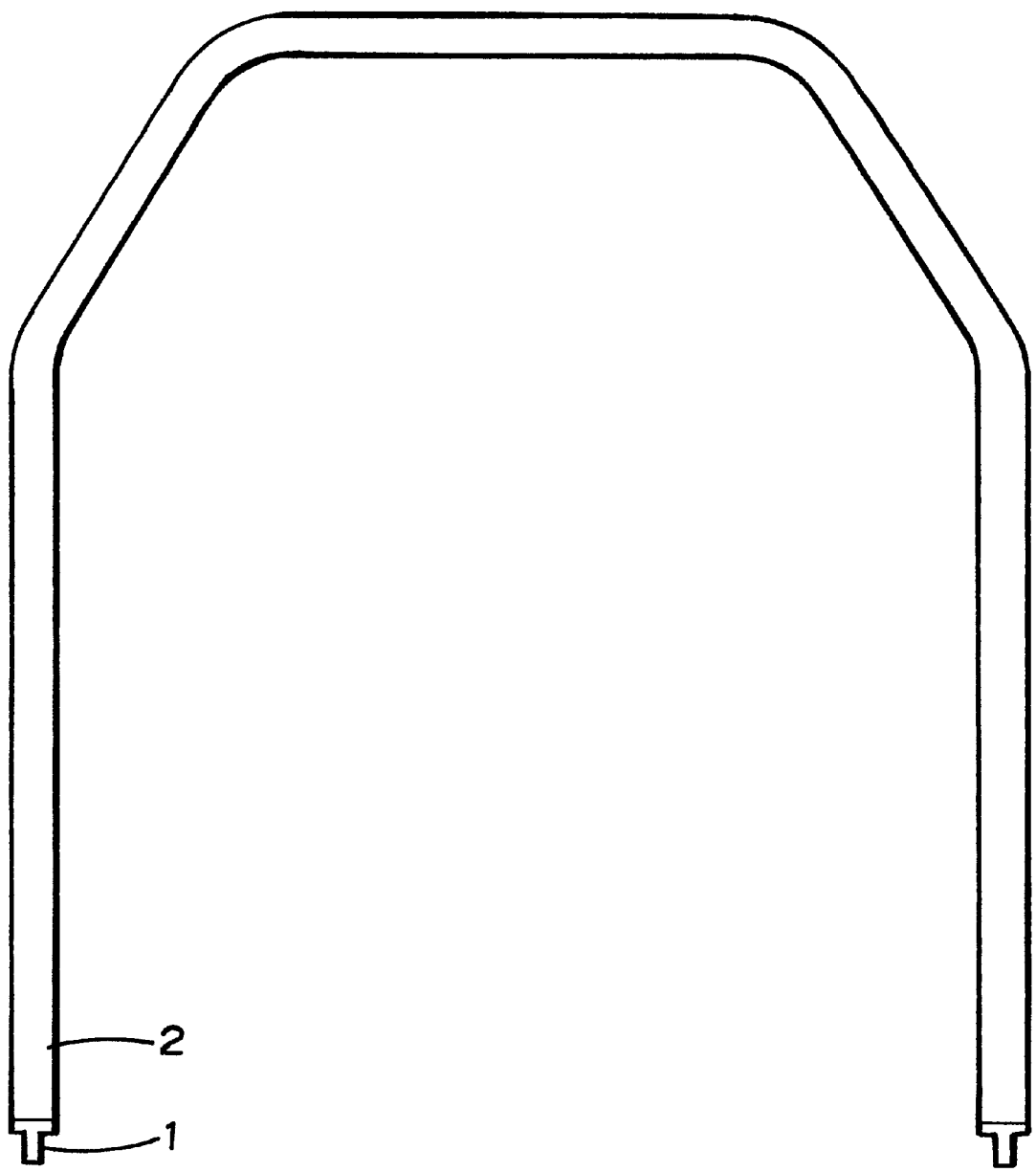
FIG. 1 shows a backrest frame in a frontal view.
Figure 2:
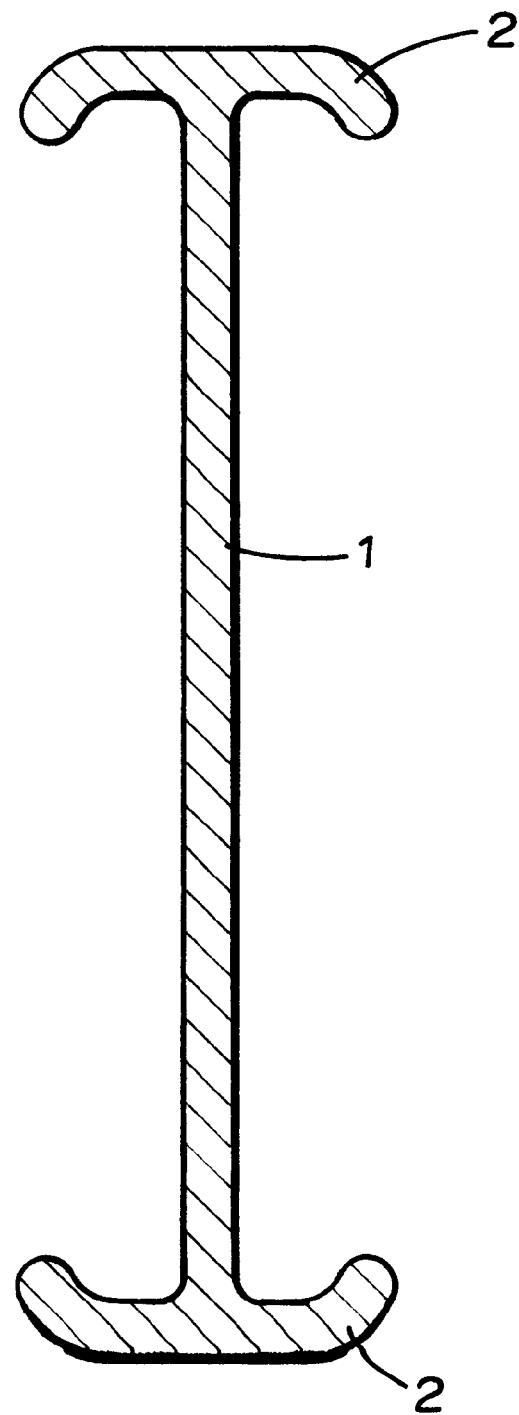
FIG. 2 shows the original cross-sectional area of the profile part used as the initial material for the backrest frame (enlarged).
Figure 3:
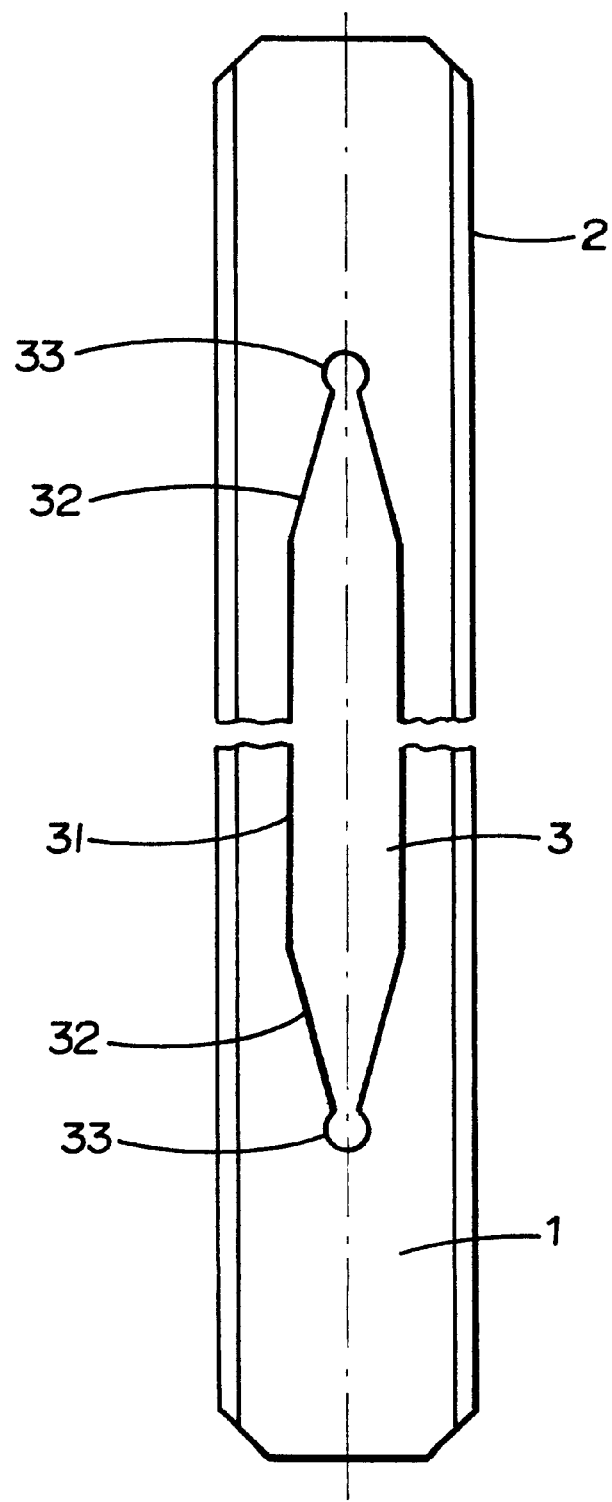
FIG. 3 shows the unformed profile part used as the initial material for the backrest frame viewed perpendicularly to the plane of the web. Opening 3 which is important for the process described here is also shown. Furthermore, openings which are used for attaching the backrest frame or for attaching the parts to the backrest frame are not shown. The openings are preferably punched.

As FIG. 3 clearly shows, in the area of the longitudinal middle of the profile part, preferably, the middle part of web 1 is removed so that opening 3 is formed which continues in the direction perpendicularly to the plane of web 1. The partial length of the profile part over which this opening 3 extends corresponds to the length of that area of the backrest frame on which a cross-sectional area reduced as compared to the original profile cross-sectional area is to be formed. This area is away from the connection sites of the backrest frame with the seat surface frame. The width of opening 3, therefore its dimension in the plane of the web perpendicularly to the profile direction, is determined on the one hand by the load which the profile part must withstand at certain locations, on the other hand by circumstances of production engineering.

Opening 3 consists preferably of middle area 31 with a roughly constant width, V-shaped areas 32 which abut it on either side in the profile direction, in which the width of the opening decreases continuously beginning from the width of the middle area as the distance increases, and of end areas 33 which are roughly arc-shaped, which are open to areas 32 and which abut it. The diameter of these arcs is small compared to the maximum width of opening 3.

Figure 4:
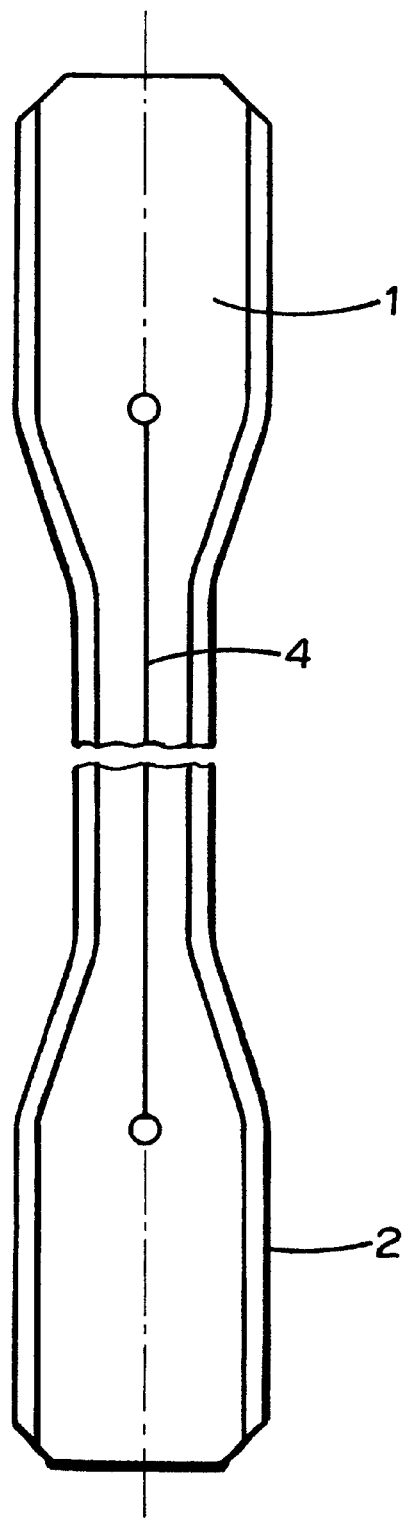
FIG. 4 shows the profile part used as the initial material for the backrest frame after it has been pressed together in its middle part in the plane of its web 1 perpendicularly to its longitudinal direction such that longitudinal opening 3 which is visible in FIG. 3 was closed in the middle part of the profile part to form joint 4.
Figure 5:
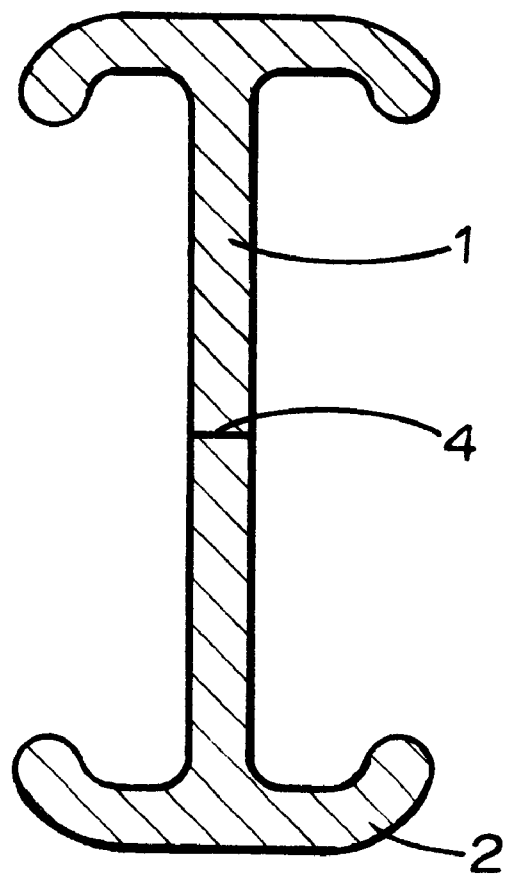
FIG. 5 shows the altered cross sectional area in the middle area of the profile part.
Figure 6:
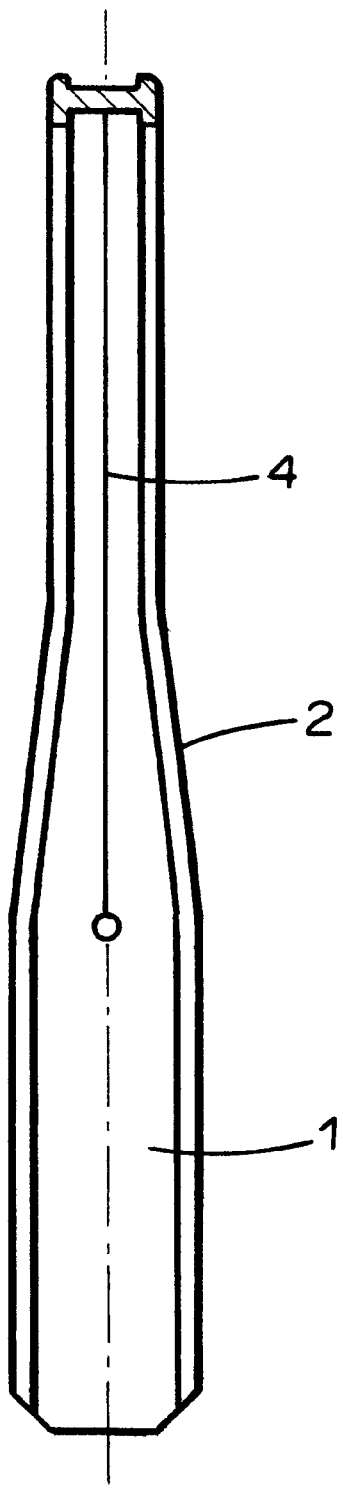
FIG. 6 shows the frame from FIG. 1 in a partial section view.

The profile part provided with this opening is formed simply by pressing two compression jaws which abut webs 2 outside and which extend over that length area of the profile part in which middle area 31 of opening 3 is located and which are moved towards one another perpendicularly to the profile direction and parallel to the plane of web 1, and is shaped into the part shown in FIG. 4. Mainly when the compression jaws also extend over V-shaped areas 32 and are shaped such that they simulate the desired outer contour of this part, during this forming only flow movements will take place parallel to the plane of the web and thus the web is not bent or thickened anywhere perpendicularly to its original plane.

The incline of the flanks of V-shaped area 32 of opening 3 to the profile axis (before forming) is roughly equal to that incline with which chords 32 after forming pass from the wider end areas of the profile part to the narrow middle area. The optimum shape of opening 3 and the compression jaws must be determined by tests on samples.

After this initial forming, opening 3 is narrowed in its middle area 31 and areas 32 abutting it to form joint 4. In order than the transmission of shear stresses which is important for the bending stiffness of the overall profile can take place, the partial surfaces of web 1 which abut one another at joint 4 are again joined to one another. The best joining process for this purpose is welding. In particular WIG, MIG and laser welding processes are suitable for aluminum profiles.

After welding, the profile part is bent into a U shape as already mentioned above. Since the welding zone is located around the neutral zone of this bending formation, very few flow processes occur in it. Therefore generally heat treatment following welding by which the deformability of the weld zone is increased to the extent required for bending is unnecessary. Optionally, it is also possible to weld only after bending.

The I cross-sectional shape is very advantageous since it satisfies all important requirements well and is simple to produce and work. But the invention can also be used for backrests from supports with multiple-I cross sectional shape or with U cross sectional shape. It is important that the cross section contain two outside chords 2 which are joined to one another by one or more webs 1.

Mainly conventional extrudable aluminum wrought allows are considered as the material for the backrest frame. Since it is possible to produce the profile part as a rolled section, the use of steel can also be considered.

In production according to the invention, besides achieving the initially mentioned object it is advantageous for the thickness of the backrest frame which is perpendicular to the backrest plane to decrease continuously from the lower backrest area to the upper backrest area. This meets the requirements for design of backrests.

I claim:

1. Process for producing the frame of the backrest of a motor vehicle seat from an originally straight metallic profile part with constant cross sectional area with a length which corresponds to the stretched length of the backrest frame, which is formed of two outside chords and one or more webs which join the two outside chords to one another, and which is bent in a U shape around axes which lie at least roughly parallel to the surface of a web and at least roughly perpendicularly to the profile direction, characterized in that at a distance from the ends of the profile part in its web (1), through opening (3) which is perpendicular to its surface is formed, edge areas of this opening (3) which are opposite one another in the surface of web (1) in the direction perpendicular to the profile direction are moved towards one another by the pressure of two compression jaws which abut webs (2) on the outside and which extend in that length area of the profile part in which opening (3) extends and move towards one another perpendicularly to the profile direction parallel to the plane of web (1) until they come to rest against one another and form joint (4), and at joint (4) the two planar parts of web (1) which abut one another are joined to one another.

2. Process according to claim 1, wherein a profile part with I-shaped cross-sectional area is used, and wherein opening (3) is formed of two roughly arc-shaped areas (33) which lie outside in the profile direction, which are open towards the profile center in adjacent areas (32), which flare in a V shape towards the profile center and finally pass into a common center zone (31) with a roughly constant width.

3. Process according to claim 2, wherein opening (3) is produced by punching and joining at joint (4) takes place by welding.

4. Process according to claim 2, wherein opening (3) is formed mirror symmetrically with respect to a plane which lies parallel to the longitudinal direction of the profile and lies symmetrically to the axis of symmetry of the profile.

5. Process according to claim 1, wherein said opening is produced by punching and joining by a welded joint.

6. Process according to claim 1, wherein said opening is formed mirror symmetrically with respect to a plane which lies parallel to the longitudinal direction of the profile and lies symmetrically to the axis of symmetry of the profile.

* * * * *